United States Patent
Xu et al.

(10) Patent No.: US 9,497,519 B2
(45) Date of Patent: Nov. 15, 2016

(54) TWIN MULTICAST SWITCH

(71) Applicant: Oplink Communications, Inc., Fremont, CA (US)

(72) Inventors: Kesheng Xu, San Ramon, CA (US); Kun Liu, Sunnyvale, CA (US); Lifu Gong, San Jose, CA (US); Feng Qing Zhou, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 0 days.

(21) Appl. No.: 14/197,015

(22) Filed: Mar. 4, 2014

(65) Prior Publication Data

US 2014/0270760 A1 Sep. 18, 2014

Related U.S. Application Data

(60) Provisional application No. 61/803,082, filed on Mar. 18, 2013.

(51) Int. Cl.
*H04J 14/00* (2006.01)
*H04B 10/20* (2006.01)
*H04J 14/02* (2006.01)
*H04Q 11/00* (2006.01)
*H04L 12/18* (2006.01)

(52) U.S. Cl.
CPC ....... *H04Q 11/0005* (2013.01); *H04J 14/0204* (2013.01); *H04J 14/0212* (2013.01); *H04J 14/0217* (2013.01); *H04L 12/18* (2013.01); *H04Q 2011/003* (2013.01); *H04Q 2011/0015* (2013.01)

(58) Field of Classification Search
CPC ............... H04J 14/022; H04J 14/0212; H04J 14/0205; H04J 14/0286; H04J 14/02
USPC .................. 398/45, 50, 66, 72, 83
See application file for complete search history.

(56) References Cited

U.S. PATENT DOCUMENTS

| | | | | |
|---|---|---|---|---|
| 4,968,977 A | * | 11/1990 | Chinnaswamy | G06F 15/17375 340/2.24 |
| 6,356,681 B1 | * | 3/2002 | Chen | G02B 6/02123 372/102 |
| 7,469,080 B2 | * | 12/2008 | Strasser | G02B 6/29367 385/15 |
| 2006/0098981 A1 | * | 5/2006 | Miura | H04J 14/0209 398/45 |
| 2008/0166087 A1 | * | 7/2008 | Strasser | G02B 6/29367 385/17 |
| 2010/0027995 A1 | * | 2/2010 | Farley | G02B 6/351 398/49 |
| 2010/0061727 A1 | * | 3/2010 | Colbourne | H04J 14/0206 398/48 |
| 2010/0129082 A1 | * | 5/2010 | Zhong | H04J 14/0204 398/83 |
| 2010/0150558 A1 | * | 6/2010 | Wisseman | H04J 14/0212 398/79 |
| 2010/0202778 A1 | * | 8/2010 | Wisseman | G02B 6/2931 398/83 |
| 2011/0164876 A1 | * | 7/2011 | Fujita | H04J 14/0204 398/48 |
| 2012/0201536 A1 | | 8/2012 | Liu et al. | |
| 2013/0202297 A1 | * | 8/2013 | Martinelli | G02B 6/3512 398/49 |
| 2014/0161454 A1 | * | 6/2014 | Roorda | H04J 14/0212 398/68 |

* cited by examiner

*Primary Examiner* — David Payne
*Assistant Examiner* — Pranesh Barua
(74) *Attorney, Agent, or Firm* — Jeffrey K. Jacobs

(57) ABSTRACT

Methods, systems, and apparatus, including computer programs encoded on computer storage media, for optical switching. An optical switch device includes a first multicast switch unit; and a second multicast switch unit, wherein each of the first and second multicast switch units respectively include: multiple optical input ports; multiple optical switches; multiple optical splitters/combiners; and multiple optical output ports.

9 Claims, 1 Drawing Sheet

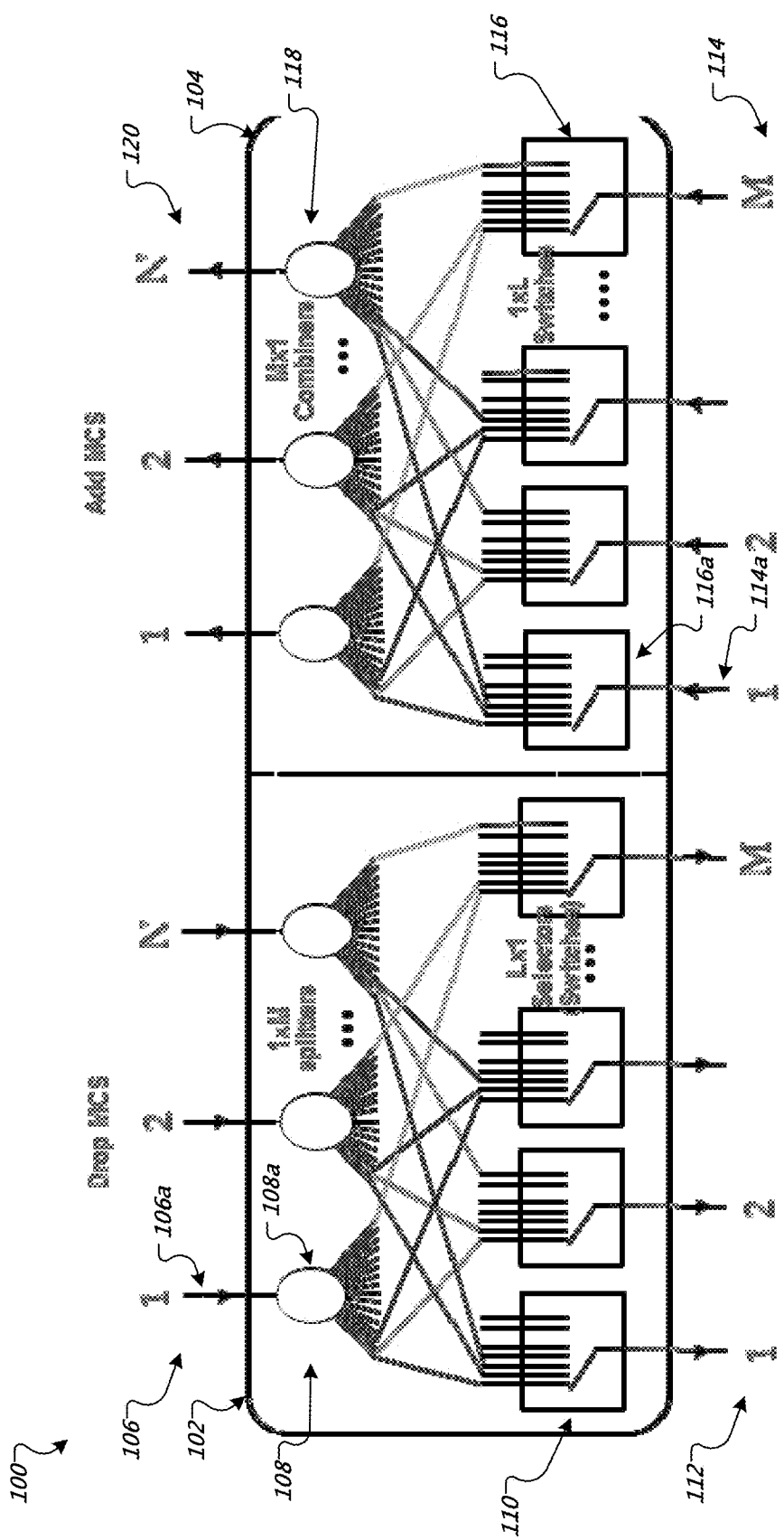

TWIN MULTICAST SWITCH

CROSS-REFERENCE TO RELATED APPLICATIONS

This application claims the benefit under 35 U.S.C. §119 to U.S. Provisional Application 61/803,082, filed on Mar. 18, 2013, which is incorporated here by reference.

BACKGROUND

This specification relates to optical switching.

There are a large number of various types of optic switches, all aiming to achieve light beam switching between one or more input optical fiber and one or more corresponding output optical fibers. Optic switches are typically used in the optical fiber communication industries, instrument industries, and defense industries.

SUMMARY

In general, one innovative aspect of the subject matter described in this specification can be embodied in optical devices that include a drop optical multicast switch unit, including: multiple input optical ports, multiple optical splitters, each optical splitter coupled to a corresponding input optical port, multiple optical switches, each optical switch coupled to each optical splitter of the multiple optical splitters, and multiple output optical ports; and an add optical multicast switch unit, including; multiple input optical ports; multiple optical switches, each optical switch coupled to a corresponding input optical port; multiple optical splitters, each optical combiner coupled to each optical switch of the multiple optical switches, and multiple output optical ports coupled to a corresponding optical combiner.

The foregoing and other embodiments can each optionally include one or more of the following features, alone or in combination. The first optical multicast switch unit and the second optical multicast switch unit are symmetrical. The first optical multicast switch unit is N×M and second optical multicast switch unit is A×B, where N×M is distinct from A×B. The optical switches are MEMS based optical switches. The multiple optical switches in first optical multicast switch unit include L×1 selectors, wherein L≥N. Extra input ports (L−N) of the L×1 selectors of the multiple optical switches are reserved as expansion ports. An input optical signal at a first optical input port of the first optical multicast switch unit is split into M portions by a corresponding optical splitter and distributed to each of the multiple optical switches. Each optical switch of the multiple optical switches in the first optical multicast switch unit receives an input from each input optical port and selects one to output to an output optical port. An input optical signal at a first optical input port of the second optical multicast switch unit is input to a first switch of the multiple optical switches, wherein the first switch is coupled to each of the multiple optical combiners such that the first switch can pass the input optical signal to any one of the multiple optical combiners.

In general, one innovative aspect of the subject matter described in this specification can be embodied in twin multicast switch modules including a first multicast switch unit; and a second multicast switch unit, wherein each of the first and second multicast switch units respectively includes: multiple optical input ports; multiple optical switches; multiple optical splitters/combiners; and multiple optical output ports.

The foregoing and other embodiments can each optionally include one or more of the following features, alone or in combination. The first multicast switch unit is a drop unit and the second multicast switch unit is an add unit.

Particular embodiments of the subject matter described in this specification can be implemented so as to realize one or more of the following advantages. A twin multicast switch provides both an add unit and a drop unit in a compact module. The twin multicast switch also has the advantages of low insertion loss, low electrical power consumption, hitless operation, as well as very low cross-talks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a diagram of an example twin N×M multicast switch module.

Like reference numbers and designations in the various drawings indicate like elements.

DETAILED DESCRIPTION

FIG. 1 is a diagram of an example twin multicast switch module 100. The twin multicast switch module 100 includes a first optical multicast switch (MCS) unit 102 and a second MCS unit 104. The first and second MCS units 102 and 104 are configured as part of the same module, but operate independently. In particular, the first MCS unit 102 and second MCS unit 104 can operate in opposite directions where the first MCS unit 102 is configured to drop optical signals while the second MCS unit 104 can be configured to add optical signals.

The first MCS unit 102 includes N input optical ports 106, N optical splitters 108, M optical switches 110, and M output optical ports 112. Each input optical port 106 is coupled to a corresponding input optical fiber. Similarly, each output optical port 112 is coupled to a corresponding output optical fiber.

Each input optical port 106 is optically coupled to a corresponding optical splitter 108. For example, input optical port 106a is optically coupled to optical splitter 108a. The optical splitters 108 are, for example, planar lightwave circuit splitters, that separate an incoming light signal into a specified number output of light signal branches. For example, in the example shown in FIG. 1, each optical splitter 108 separates an incoming optical signal from a corresponding input optical port 106 into M optical branches. In particular, each optical splitter 108 can be configured to separate an incoming optical signal into a number of optical signals that corresponds to the number of optical switches 110.

The optical switches 110 can be any suitable compact, low loss, and lower power switch. For example, the optical switches 110 can be micro-electro-mechanical-systems (MEMS) based optical switches. The optical switches 110 include L×1 selectors where L is greater than or equal to the number of input optical ports N. In particular, each optical switch 110 receives an input to a selector of the L selectors from each respective optical splitter 108. Thus, each optical switch 110 has an input corresponding to each optical input port 106.

For example, a first input port of each L×1 optical switch 110 is optically coupled to one branch of a first optical splitter 108, a second input port of each optical switch 110 is optically coupled to one branch of a second optical splitter 108 and a N-th input port of each optical switch 110 is optically coupled to one branch of a N-th optical splitter 108.

Additionally, there can be additional unused selectors in one or more of the optical switches 110 when L is greater than N. In some implementations, these extra selector ports of the optical switches 110 are reserved for upgrade purposes as expansion ports. There are (L–N) expansion ports. The extra ports are grouped by sequentially selecting one of the extra ports from each optical switch and each group is used as an expansion array-port for future upgrade. The expansion array-port can be used, for example, if an additional input optical port is added to the MCS unit 102.

In operation, optical signals into any optical input port 106 are split into M portions by the optical splitters 108. The optical signals are then distributed to each of the M switches 110. Thus, each of the M optical switches 110 receives optical signals from all of the N input optical ports 106. The optical switches 110 each controllably couple one of the received optical signals to a corresponding output optical port 112. As a result, one or more signals from the N input optical ports 106 are selectively output by M output optical ports 112. For example, the optical signal from a first input optical port 106 can be switched to any number of output optical ports from zero to M.

The second MCS unit 104 includes M input optical ports 114, M optical switches 116, N optical combiners 118, and N output optical ports 120. Each input optical port 114 is coupled to a corresponding input optical fiber. Similarly, each output optical port 120 is coupled to a corresponding output optical fiber.

Each input optical port 114 is optically coupled to a corresponding optical switch 116. For example, input optical port 114a is optically coupled to optical switch 116a. The optical switches 116 can be any suitable compact, low loss, and lower power switch. For example, the optical switches 116 can be MEMS based optical switches. The optical switches 116 include 1×L selectors where L is greater than or equal to the number of output ports N. At least N selectors of each optical switch 116 are optically coupled to branches of the respective optical combiners 118. However, additional selectors when L is greater than N can be included as expansion ports as described above.

The optical combiners 118 are, for example, planar lightwave circuit combiners, that combine multiple incoming light signals into a single light signal that corresponds to an optical output port 120. For example, in the MCS unit 104 of FIG. 1, each of the optical combiners 118 includes a branch that is optically coupled to a respective port of each optical switch 116.

Thus, each optical switch 116 has output corresponding to a branch of each optical combiner 118, and therefore to each output optical port 120. For example, a first output port of each 1×L optical switch 116 is optically coupled to one branch of a first optical combiner 118, a second output port of each optical switch 116 is optically coupled to one branch of a second optical combiner 118 and a N-th output port of each optical switch 116 is optically coupled to one branch of a N-th optical combiner 118.

In operation, optical signals into any optical input port 114 are input into corresponding optical switches 116. Each optical switch 116 selectively passes the input optical signals to a particular output port of the optical switch 116. The optical signal is routed to a particular optical combiner 118 based on the selected output port. One or more optical signals received at a particular optical combiner 118 are combined and passed to a corresponding output optical port 120. Thus, each of the M received optical signals are selectively routed to one or more of the N output optical ports 120. For example, a first optical signal from a first input port and a second optical signal from a second input port can be switched to the same output optical port or different optical ports depending on the switch positions.

Both the first MCS unit 102 and the second MCS unit 104 as shown are symmetrical N×M units. The value of N can be, for example, 4, 8, 12 or 16 ports while the corresponding value of M can be, for example, 4, 8, 12, or 16 ports.

The first MCS unit 102 and the second MSC unit 104 can also be asymmetrical. For example, the first MCS unit 102 can be an N×M unit while the second MCS unit 104 can be an A×B unit having a distinct number of input and output optical ports.

The optical splitters 108 and optical combiners 118 can be optically bi-direction. Therefore, the optical splitters 108 and optical combiners 118 can be the same optical devices. The optical splitters and optical switches can be wideband devices such that the ports of twin multicast switch module 100 are wavelength independent.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An optical device comprising:
   a first optical multicast switch unit comprising a drop optical multicast switch unit, the drop optical multicast switch unit comprising:
   a plurality of input optical ports, a plurality of optical splitters, each optical splitter coupled to a corresponding input optical port, a plurality of optical switches, each optical switch having L number of selectors, wherein N selectors of the L number of selectors, N being less than L, are respectively coupled to a corresponding optical splitter of the plurality of optical splitters, and wherein (L-N) selectors are reserved for expanding a number of input optical ports coupled to the plurality of optical switches, and a plurality of output optical ports, each optical output port coupled to an output of a corresponding optical switch of the plurality of optical switches; and a second optical multicast switch unit comprising an add optical multicast switch unit, the add optical multicast switch unit comprising;

a plurality of input optical ports;

a plurality of optical switches, each optical switch coupled to a corresponding input optical port and each optical switch configured to selectively route an optical signal received from a corresponding input optical port to one or more optical combiners;

a plurality of optical combiners, each optical combiner coupled to each optical switch of the plurality of optical switches, and a plurality of output optical ports coupled to a corresponding optical combiner.

2. The optical device of claim 1, wherein the first optical multicast switch unit and the second optical multicast switch unit are symmetrical.

3. The optical device of claim 1, wherein the first optical multicast switch unit is N×M and second optical multicast switch unit is A×B, where N×M is distinct from A×B.

4. The optical device of claim 1, wherein the optical switches are micro-electro-mechanical-systems (MEMS) based optical switches.

5. The optical device of claim 1, wherein an input optical signal at a first optical input port of the first optical multicast switch unit is split into M portions by a corresponding optical splitter and distributed to each of the plurality of optical switches.

6. The optical device of claim 1, wherein each optical switch of the plurality of optical switches in the first optical multicast switch unit receives an input from each input optical port and selects one to output to an output optical port.

7. The optical device of claim 1, wherein an input optical signal at a first optical input port of the second optical multicast switch unit is input to a first switch of the plurality of optical switches, wherein the first switch is coupled to each of the plurality of optical combiners such that the first switch can pass the input optical signal to any one of the plurality of optical combiners.

8. The optical device of claim 1, wherein the plurality of optical splitters and the plurality of optical switches of the drop optical multicast switch unit are wideband devices thereby providing wideband wavelength independence for the plurality of input optical ports and output optical ports of the drop optical multicast switch unit.

9. An optical device comprising:

a first optical multicast switch unit comprising a drop optical multicast switch unit, the drop optical multicast switch unit comprising:

a plurality of input optical ports, a plurality of optical splitters, each optical splitter coupled to a corresponding input optical port, a plurality of optical switches, each optical switch coupled to each optical splitter of the plurality of optical splitters, and a plurality of output optical ports, each optical output port coupled to an output of a corresponding optical switch of the plurality of optical switches; and a second optical multicast switch unit comprising an add optical multicast switch unit, the add optical multicast switch unit comprising;

a plurality of input optical ports;

a plurality of optical switches, each optical switch coupled to a corresponding input optical port and each optical switch configured to selectively route an optical signal received from a corresponding input optical port to one or more optical combiners;

a plurality of optical combiners, each optical combiner coupled to each optical switch of the plurality of optical switches, and a plurality of output optical ports coupled to a corresponding optical combiner, wherein each optical combiner of the plurality of optical combiners corresponds to one optical splitter of the plurality of optical splitters and wherein each of the corresponding optical combiner-optical splitter pairs is the same optically bi-directional device.

* * * * *